(12) United States Patent
Rafferty et al.

(10) Patent No.: US 6,346,211 B1
(45) Date of Patent: Feb. 12, 2002

(54) BENDING OF THERMOPLASTIC TUBES

(75) Inventors: John Rafferty, Nr. Olney; Robert Davidson, Market Harborough, both of (GB)

(73) Assignee: McKechnie Engineered Plastics Limited, West Midlands (GB)

( * ) Notice: Subject to any disclaimer, the term of this patent is extended or adjusted under 35 U.S.C. 154(b) by 0 days.

(21) Appl. No.: 09/397,223

(22) Filed: Sep. 16, 1999

(51) Int. Cl.[7] .................. B21D 9/00; B29C 53/08; B29C 53/84
(52) U.S. Cl. .................. 264/573; 72/57; 72/201; 72/296; 72/369; 264/322; 264/339; 425/342.1; 425/363; 425/384; 425/392
(58) Field of Search ................ 264/322, 339, 264/573; 425/342.1, 363, 384, 392; 72/57, 201, 296, 369

(56) References Cited

U.S. PATENT DOCUMENTS 3,753,635 A * 8/1973 Barnett .................. 264/339 X

FOREIGN PATENT DOCUMENTS

| EP | 0 199 246 A2 | 10/1986 |
| GB | 1 421 454 | 1/1976 |
| GB | 2 249 750 B | 5/1992 |
| GB | 2 249 750 A | 5/1992 |
| JP | 11-221853 | 8/1999 |
| ZA | 8204261 | 2/1983 |

* cited by examiner

*Primary Examiner*—Leo B. Tentoni
(74) *Attorney, Agent, or Firm*—McCormick, Paulding & Huber LLP

(57) ABSTRACT

A method and apparatus for bending thermoplastic tube in which a pre-heated region of the tube is conformed to a required bend configuration while supported internally and externally to prevent the tube wall collapsing. The external support is provided by relatively movable formers which enclose a section of the tube at the point where the bending force is applied and this enclosed section moves progressively along the heated region as the bend is developed by the relative movement of the formers. The internal support is provided by fluid pressure higher than atmospheric pressure within the tube during the forming operation. Multiple bends can be formed sequentially and/or siitultateously.

26 Claims, 11 Drawing Sheets

BENDING OF THERMOPLASTIC TUBES

This invention concerns improvements in or relating to bending of thermoplastic tubes. More specifically, the invention provides an improved method or apparatus for bending of thermoplastic tubes. The invention has particular application t bending of thin wall large bore thermoplastic tubes. As used herein, the term "tube" includes hoses, pipes or similar conduits, whether of single or multi-layer construction.

Thermoplastic tubes are used for many applications, for example in the automotive field where the tube may have to be of a specific configuration with one or more bends to provide the necessary fluid flow connection.

It is desirable to form such tubes having smooth bends with minimum distortion of the tube wall giving non-turbulent flow to maintain the optimum flow characteristics through the tube and produce an aesthetically pleasing appearance.

A method and apparatus for shaping thermoplastic tube is described in UK Patent No. 2249750-B in which the tube is pre-formed to a required bend configuration prior to effecting contactless heating of the bend region by pulsed emission of infra-red radiation to soften the thermoplastic material followed by air cooling to set the thermoplastic material and retain the required bend configuration.

The tube is pre-shaped on a jig with appropriately positioned sources of infra-red radiation and air to carry out the heating and cooling stages with the tube held stationary on the jig.

With this method and apparatus, it is possible to produce tubes of complex shape with multiple bends in different planes being formed simultaneously. This method is particularly suitable for shaping small bore thermoplastic tubes without requiring any internal support such as a separate removable mandrel to prevent the tube wall collapsing.

Problems can arise however in trying to shape thin wall large bore thermoplastic tube by such method and apparatus. In particular, there is a much greater tendency for thin wall large bore tube to flatten across their section at 90° to the bend axis resulting in an elliptical shaped bore or, in extreme cases, the tube may fold or even collapse on it itself producing an unacceptably deformed tube.

As a result, it is still common for thin wall large bore tubes to be provided with an internal solid mandrel which is flexible to allow the tube to be formed to the required shape and which is removed after the tube is set in the required shape. The use of such mandrels adds to production costs and restricts the shapes that can be produced without completely stopping the tube creasing. Thus, sufficient clearance has to be allowed for insertion and removal of the mandrel. As a result, some collapse of the tube wall may occur during forming and the formed lube may be deformed by removal of the mandrel. In addition, lubricants which are possible undesirable contaminants may have to be used to assist removal of the mandrel.

It is an object of the present invention to provide an improved method and apparatus for shaping thermoplastic tubes which enables bends to be formed in a wider range of tube sizes than previously.

It is a particular desired object of the present invention to provide an improved method and apparatus for shaping thin wall large bore thermoplastic tubes.

It is a further preferred object of the present invention to provide an improved method and apparatus for shaping thin wall large bore thermoplastic tubes which enables bends to be formed without significantly changing the bore section.

It is yet another preferred object of the present invention to provide an improved method and apparatus for shaping thin wall large bore thermoplastic tubes which enables bends to be formed having a small radius or angle.

It is still further preferred object of the present invention to provide an improved method and apparatus for shaping thin wall large bore thermoplastic tubes to provide multiple bends in different planes enabling complex shapes to be produced.

According to one aspect of the present invention there is provided a method of forming a bend having a required configuration in a tube of thermoplastic material comprising locally heating a region of the tube in which a bend is to be formed until the plastic material becomes sufficiently plastic for subsequent shaping to a required bend configuration, positioning the tube between relatively movable formers providing external support around a section of the heated region of the tube, relatively moving the formers to form progressively the required bend configuration while simultaneously providing internal support for the tube by a pressure differential between the inside and outside of the tube, and cooling the tube to set thermoplastic material and retain the required bend configuration.

By this invented method, the formation of the bend with the required configuration is achieved without deforming or collapsing so as to maintain substantially the original cross-section of the tube. This is made possible in the invented method by supporting the tube internally and externally during the bending operation.

In particular, the relatively movable formers enclose a section of the tube at the point where the bending force is applied and this enclosed section moves progressively along the heated region as the bend is developed by the relative movement of the farmers.

Preferably, the pressure differential is created by the provision of a fluid medium, conveniently compressed air, within the tube during the forming operation. The fluid medium may be confined within the tube by appropriate sealing means at each end of the tube. Alternatively, the fluid medium may be confined in an inflatable bladder inserted into the tube.

Advantageously, cooling is effected externally and/or internally, for example by a fluid medium, such as a gas or liquid, caused to flow over the exterior andor through the interior of the tube by any suitable means,such as fans, blowers, sprays etc.

Preferably, the pressure differential is maintained during the cooling stage to prevent the tube deforming or collapsing before the thermoplastic material has set. This may be achieved by the use of compressed air both in the forming and cooling stages.

Advantageously, external support on the inside of the bend is maintained as the bend is developed. For example, the tube may be progressively formed around a former having a profile corresponding substantially to the profile of the required bend.

Preferably, external support on the outside of the bend is provided at the point where bending forces are applied and moves along the tube as the bend is developed. For example, a former for the outside of the bend may move around the former for the inside of the bend. In this way, as the bend is developed, the section of the tube being formed is totally enclosed.

The formers may be relatively movable to form the bend in one or more planes. More than one bend may be formed at spaced apart positions along the length of the tube to produce complex configurations. Multiple bends may be in the same or different planes.

It may be possible with the invented method to form two bends simultaneously with further bends produced in pairs sequentially along the length of the tube as desired.

According to another aspect of the present invention there is provided apparatus for forming a bend in a tube of thermoplastic material comprising means for heating a predetermined region of a tube to soften the plastic material for subsequent shaping, means for shaping the heated region of the tube to form a bend having a required configuration, and means for cooling the tube to set the thermoplastic material and retain the required bend configuration, the shaping means including relatively movable former means for externally supporting a section of the heated region of the tube at the point of bending and means for internally supporting the tube during the being operation by a pressure differential between the inside and outside of the tube.

The former means provide localised external support around the tube as the bend is formed, with the pressure differential providing internal support to prevent the tube collapsing or deforming.

Preferably, the former means comprises a fixed former having a profile corresponding to the inside of the bend and a former movable around the fixed former to conform the tube to the profile of the fixed former and provide support for the outside of the bend at the point of bending.

In this way, the section of the tube where the bending forces are applied is totally enclosed by the formers and this external support around the tube is maintained locally by relative movement of the formers as the bend is developed.

Advantageously, the fixed former has a peripheral groove corresponding to the radius of the required bend around which the tube is formed and the movable former has a peripheral groove co-operable with the groove in the fixed former to provide external support around the section of the tube therebetween. The peripheral groove in the fixed former may be of constant or variable radius and/or may be in one or more planes depending on the desired shape and configuration of the finished bend.

Preferably, the groove in the fixed former is of U-shape in radial cross-section and is a depth sufficient to receive the tube and the marginal edge of the movable former. In this way the movable former is guided for movement around the fixed former to conform the tube to the required configuration. Where the peripheral groove in the fixed former is of variable radius and/or in more than one plane, the movable roller may be adjustable to compensate for such changes so as to follow the profile of the fixed former. For example, the movable former may be spring loaded and/or angularly adjustable.

Advantageously, means is provided for securing the tube in the forming means during the forming operation. For example, the tube may be clamped at a position adjacent to the end of the heated region where the bending operation begins leaving the other end of the tube free for conforming the heated region to the required bend configuration.

Preferably, the means for internally supporting the tube comprises a source of fluid, e.g. compressed air, connectable to the interior of the tube via a valve in one of two seal units for the opposite ends respectively of the tube. Alternatively, the fluid source is connectable to an inflatable bladder positioned within the tube.

Advantageously, the means for cooling the tube comprises a source of fluid, e.g. a gas or liquid, passed over and/or through the tube. Where compressed air is used to provide internal support for the tube during the forming stage, the compressed air may be passed through the tube to cool the tube and maintain the internal support during the cooling stage.

The invention will now be described in more detail by way of example only with reference to the accompanying drawings wherein.

Referring first to FIGS. 1 to 16 of the drawings, the method of forming a bend having a required configuration according to the invention will be described briefly with reference to FIG. 16 followed by a description of apparatus for carrying out the method with reference to FIGS. 1 to 15.

Figure 16:
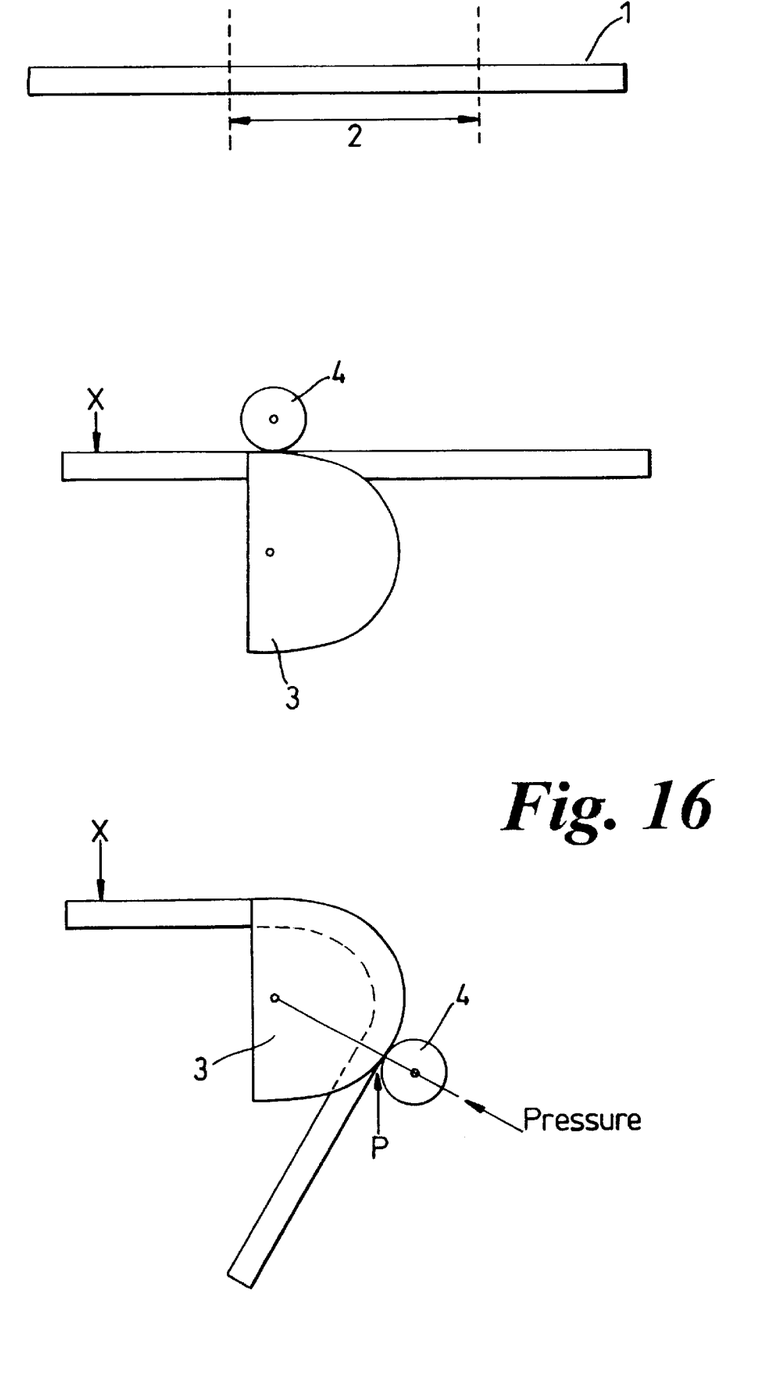
FIG. 16 depicts schematically the stages of the method for shaping thermoplastic tube according to the invention.

As shown in FIG. 16, a length of thermoplastic tube of circular cross section is first heated locally in the region 2 in which a bend is to be formed until the thermoplastic material softens sufficiently to allow subsequent shaping.

During this heating stage, the interior of the tube 1 is open to atmosphere so that the pressure inside and outside the tube is the same and heating is controlled to prevent the tube 1 from collapsing.

On completion of the heating stage, the tube is formed to the required bead configuration by progressively bending the heated region 2 of the tube 1 around a former 3 with a forming roller 4 while axially securing the tube 1 as indicated by the arrow X adjacent to the end of the heated region 2 where the bending operation begins.

During this bending stage, the interior of the tube 1 is connected to a source of compressed air 50 that the pressure inside the tube 1 is higher than atmospheric pressure outside the tube and the pressure differential is controlled to provide internal support for the tube 1 during the bending operation. Alternatively, the internal support may be provided by connecting the source of compressed air to an inflatable bladder (not shown) positioned in the tube 1 after the heating stage. The bladder may be partially inflated to assist insertion into the tube prior to inflating fully to support the tube. The use of a bladder may allow end fittings to be attached to the straight tube prior to shaping.

At the same time, external support for the tube 1 is provided by the former 3 and former roller 4 which cooperate to enclose the tube 1 at the point where pressure is applied during the bending operation. This combination of internal and external support during the bending stage ensures that the circular cross-section of the tube is maintained throughout the bend.

On completion of the bending stage, the tube 1 is externally cooled to set the thermoplastic material in the required bend configuration by passing air over the outside of the tube 1. Alternatively or on in addition, the tube 1 may be cooled internally by passing air through the inside of the tube 1.

During this cooling stage, the tube 1 is held in the required bend configuration until the thermoplastic material has set to retain the bend configuration. Where internal support is provided by an inflatable bladder, the bladder is preferably at least partially deflated after the thermoplastic material has set to facilitate removal.

The above-described method has application to thermoplastic tubes of different sizes but is especially suitable for forming bends in thin wall large bore tubes. The particular problems arising when shaping thin wall large bore tubes are avoided by the above method in which the tube is pre-heated prior to shaping and fully supported internally and externally during shaping. These and other advantages of the invented method will be apparent for the following description of one apparatus for carrying out the method.

Referring first to FIGS. 1 to 4, a heating unit 5 is shown for locally heating the tube 1 in the region 2 in which the bend is to be formed.

The heating unit 5 comprises a rectangular block 6 split into two parts 6a, 6b. Each part 6a, 6b is made of aluminium with a semicircular channel 7 of slightly larger radius than the tube 1 in its inner surface and has a flat plate electrical heater 8 fixed to its outer surface covered by a sheet of thermal insulation material 9. Aluminium is the preferred material for the block 6 because of its light weight and thermal conductivity properties but it will be understood that other materials could be used for the block 6.

Figure 1:
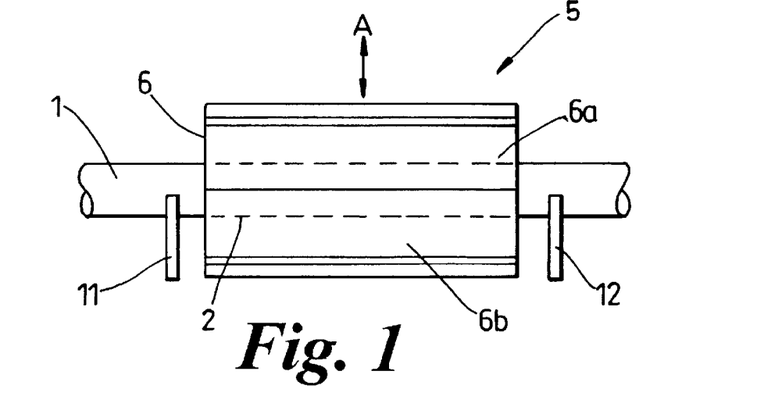
FIG. 1 is a side view of a hearing unit of apparatus embodying the invention.
Figure 2:
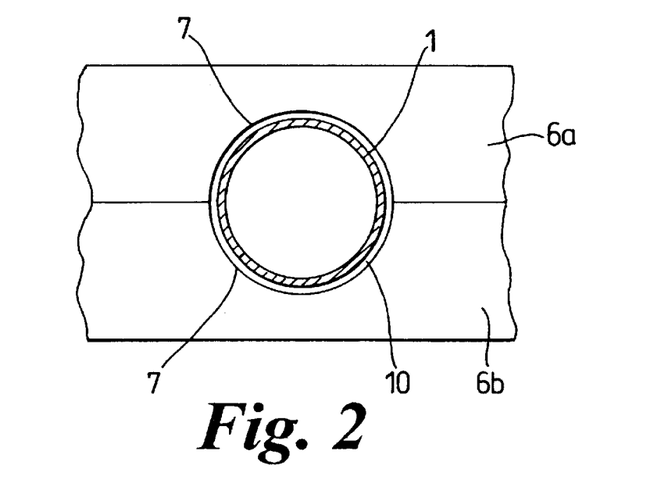
FIG. 2 is an end view, to an enlarged scale and partly in section, of the heating unit shown in FIG. 1.
Figure 3:
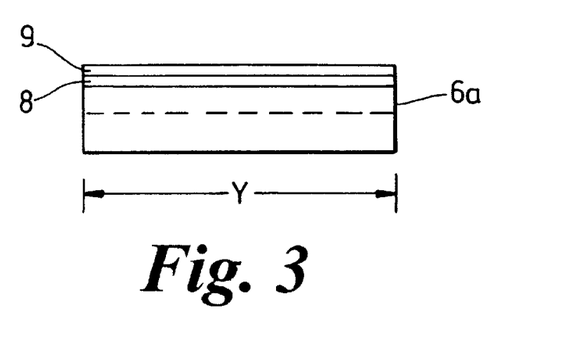
FIG. 3 is a side view of one half of the beating unit shown in FIG. 1.
Figure 4:
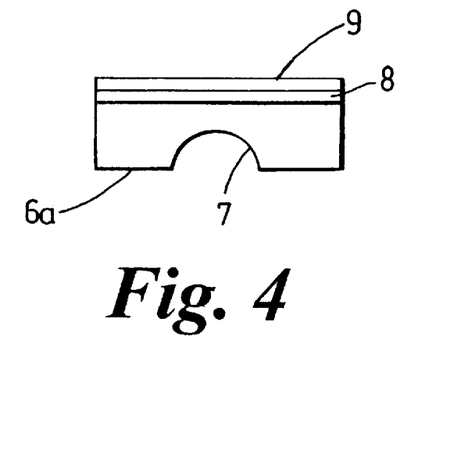
FIG. 4 is an end view the half of the heating unit shown in FIG. 3.

The channels 7 co-operate in the closed condition of the block 6 shown in FIGS. 1 and 2 to surround the tube 1 with a small annular clearance space 10 between the tube 1 and the block 6 so as to avoid direct contact between the tube 1 and the block 6 in the region 2 to be heated.

The upper part 6a of the block 6 is movable relative to the lower part 6b in the direction indicated by the arrow A in FIG. 1 for loading and unloading of the tube 1. The tube 1 is supported at regions spaced from each end of the block 6 by insulated supports 11, 12 giving the annular clearance space 10 when the block 6 is closed.

The region 2 of the tube to be heated is determined by the position and length of the bend to be formed and the length Y of the channel 7 is varied accordingly. For example, the length Y of the channel 7 may be varied by selecting the appropriate block 6 from sets of blocks 6 of different length. Alternatively, the length Y of the channel 7 may be varied by arranging two or more blocks 6 of the same or different length in series.

The tube 1 is heated to soften the thermoplastic material in the region 2 for the subsequent bending operation as previously described. The temperature is controlled by any suitable thermostatic device (not shown) to prevent the tube 1 melting or deforming in the region 2 while the clearance space 10 avoids contact with the block 6 to prevent damage to the surface of the tube 1 in the region 2.

Whilst located in the block 6, the interior of the tube 1 is open to atmosphere so that the pressure inside and outside the tube 1 is the same. As a result, air is not trapped within the tube 1 and can escape from each end when the tube 1 is heated causing the air to expand. In this way, an uncontrollable increase in pressure within the tube 1 which could result in deformation of the tube 1 in the region 2 as the thermoplastic material softens is avoided.

Furthermore, energy is not expended in first heating and later cooling air trapped in the tube and there is less risk of heat transfer to the regions of the tube 1 outside the heating zone within the block 6. As a result, the heating stage is more efficient and can be controlled more easily to ensure the tube 1 is heated to the required temperature.

Figure 5:
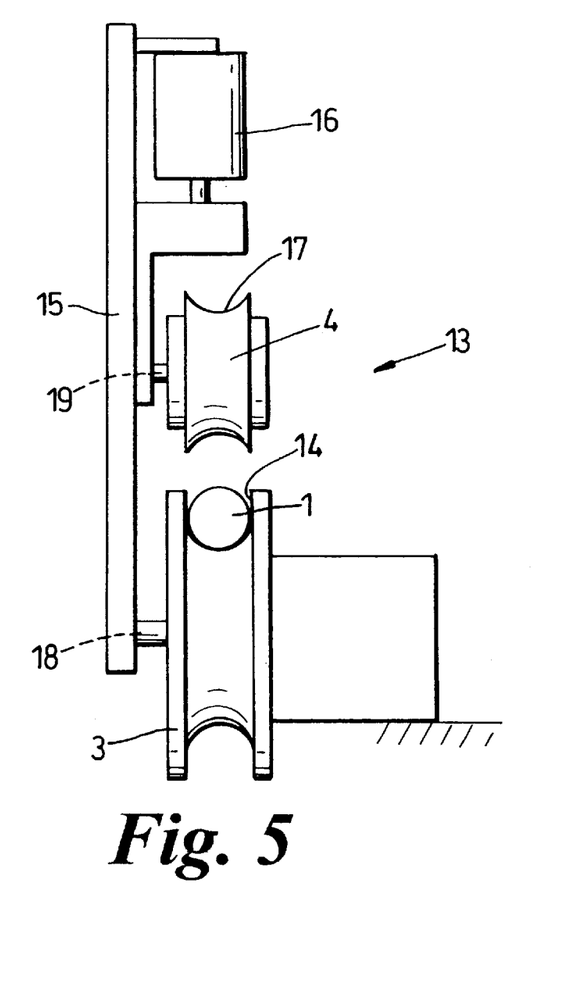
FIG. 5 is an end view of a forming unit of apparatus embodying the invention, with the moveable forming roller in the open position.
Figure 6:
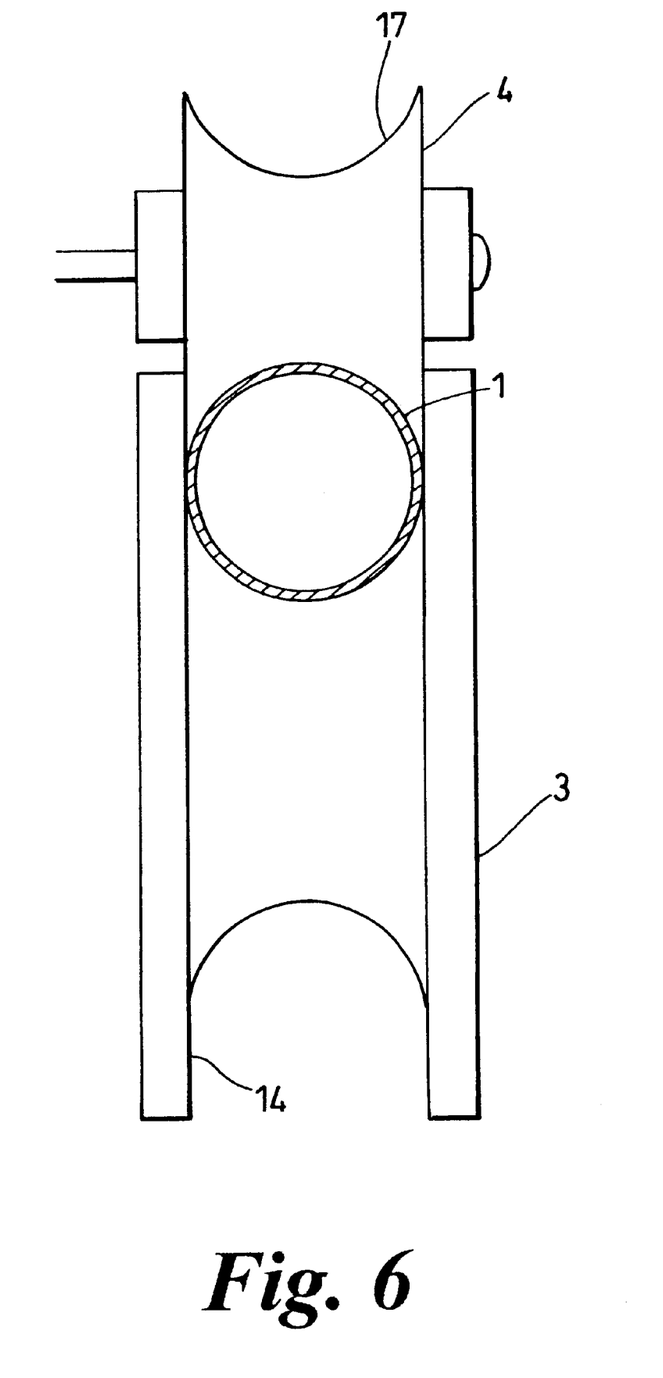
FIG. 6 is au end view, to an enlarged scale and partly in section, of part of the forming unit of FIG. 5 showing the forming roller in the closed position.

Referring now to FIGS. 5 and 6, a forming unit 13 for shaping the tube 1 to the required bend configuration is shown including former 3 and forming roller 4.

The former 3 is fixed and has a part annular peripheral groove 14 of U-shape in radial cross-section. The groove 14 is of constant radius corresponding to the radius of the bend to be formed and is of sufficient depth to receive the tube 1 as shown in FIG. 5.

The roller 4 is supported on a plate 15 for radial movement relative to the former 3 under the control of a piston/cylinder device 16 between an open position shown in FIG. 5 and a closed position shown in FIG. 6.

The roller 4 has an annular peripheral groove 17 of C-shape in radial cross-section co-operable with the groove 14 of the former 3 to enclose a section of the tube 1 in the closed position as shown in FIG. 6 in which the peripheral edge of the roller 4 is received between the side walls of the groove 14.

The plate 15 is rotatable by any suitable means (not shown) about an axis 18 through the centre of curvature of the groove 14 for moving the roller 4 around the former 3 to form a bend having the required configuration.

The roller 4 is free to rotate about an axis 19 parallel to and spaced from the axis 18 for rolling engagement with the tube 1 as it moves around the former 3 and the pressure applied by the roller 4 is adjustable through the piston/cylinder device 16 controlling radial movement of the roller 4.

In this ways the cross-sectional shape of the tube 1 is maintained and damage to the surface of the tube 1 substantially avoided during the bending operation. In particular, the former 3 and roller 4 totally enclose the tube 1 at the point where pressure is applied to bend the tube 1 so that the bending forces are contained within the enclosed section of the tube 1 and are resisted by the internal air pressure as the bend is developed by the movement of the roller 4 around the former 3 so that the tube 1 does not spread or flatten or fold or otherwise deform or suffer surface damage during the bending operation.

Figure 7:
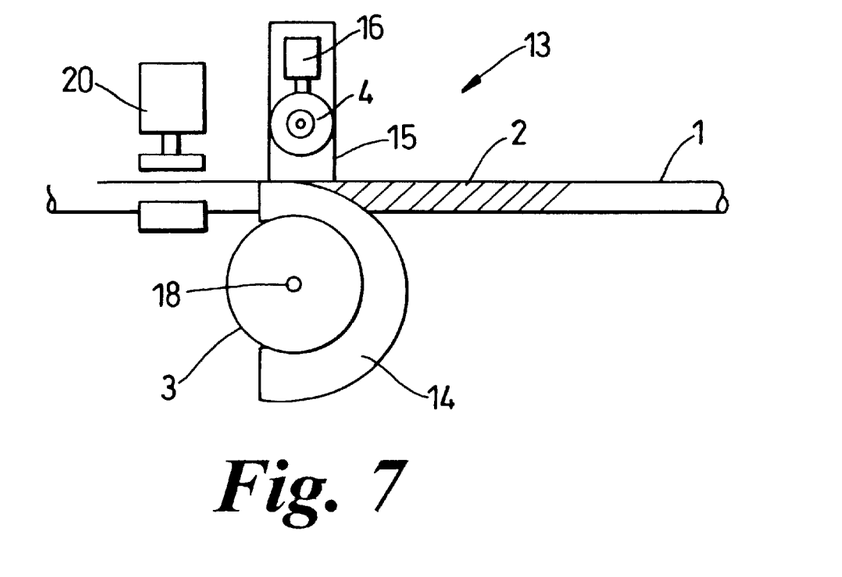
FIG. 7 is a side view of the forming unit of FIG. 5 with the forming roller in the open position.
Figure 8:
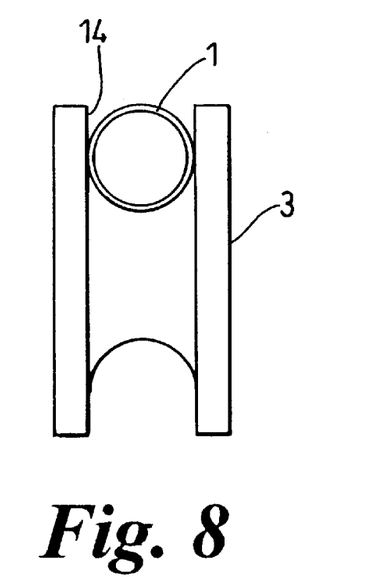
FIG. 8 is an end view showing the tube positioned in the fixed former of FIG. 5.

Operation of the forming unit 13 will now be described with reference to FIGS. 7 to 10. Tube 1 from the heating unit 5 is loaded in the forming unit 13 with roller 4 in the open position by locating one end of the preheated region 2 in the groove 14 of the former 3 opposite the roller 4 as shown in FIGS. 7 and 8.

Figure 9:
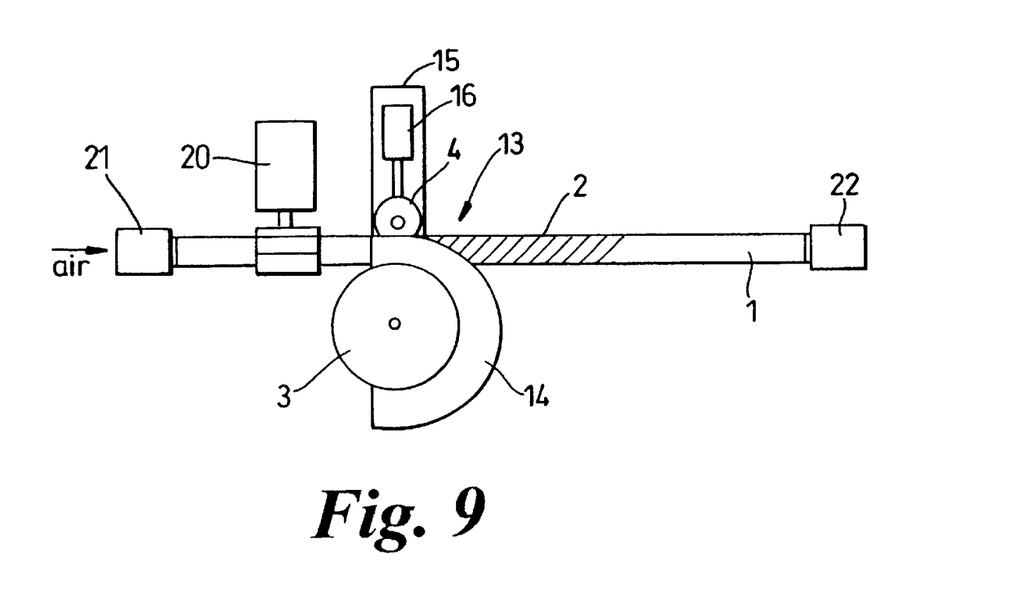
FIG. 9 is a side view, similar to FIG. 7 showing the forming roller in the closed position at the start of the bending cycle.

The tube 1 is secured in this position by closing a clamp device 20 around an unheated region of the tube 1 adjacent to the end of the heated region 2 as shown in FIG. 9.

Seal units 21, 22 are fixed to opposite ends of the tube respectively and pressurised air introduced into the interior of the tube 1 through a valve (not shown) in the seal unit 21. The pressure is controlled to support the tube 1 without deforming the heated region 2.

Figure 10:
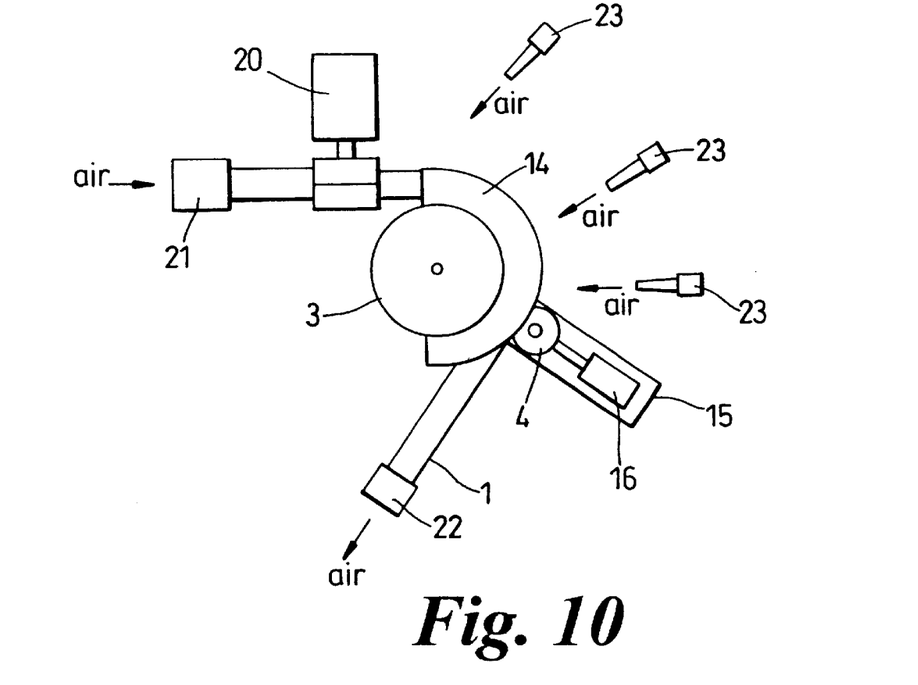
FIG. 10 is a side view, similar to FIG. 9, showing the forming roller in the closed position at the end of the bending cycle.

The roller 4 is then moved to the closed position shown in FIG. 9 to enclose a section of the tube 1 at the end of the heated region 2 and moved around the former 3 so that the heated region 2 of the tube 1 is formed progressively to the required bend configuration as shown in FIG. 10.

At the end of the forming stage, the tube 1 is held in the required bend configuration at the end of the heated region 2 by the clamping device 20 and at the other end between the former 3 and roller 4. Compressed air is then directed over the outer surface of the tube 1 from nozzles 23 to cool rapidly the heated region 2 of the tube 1 to set the thermoplastic material and retain the formed bend configuration.

Compressed air may also be passed through the interior of the tube 1 by opening a valve in the other seal unit 22 to assist cooling while retaining sufficient internal pressure to prevent the tube wall deforming. Cooling may be further assisted by the use of aluminium for the former 3 to conduct heat away from the tube.

On completion of the cooling cycle, the roller 4 is returned to the start position and the tube 1 released by moving the roller 4 to the open position, releasing the clamp device 20 and removing the seal units 21, 22.

As will now be understood, the tube 1 is internally and externally supported during the forming operation. The internal support is provided by creating a pressure differential between the interior and exterior of the tube 1 through the introduction of compressed air into the tube 1. The external support is provided on the inside of the bend by the former 3 and on the outside of the bend by the roller 4 as it moves around the former 3. The area where the former 3 initially contacts the tube 1 and where the roller 4 waits whilst cooling takes place are preferably unheated in order to avoid creating an impression of the roller 4 in the tube 1 at these points.

By this combination of internal and external support, smooth bends can be formed in which the original cross-section of the tube 1 is maintained so that, in use, flow through the tube 1 is not affected. This is of particular benefit for the formation of bends in thin wall large bore tubes which are especially susceptible to deformation when bends are formed by other methods in which the tube is pre-shaped prior to heating and/or is not fully supported internally and externally during shaping. Thus, the invented method and apparatus has particular application to tubes in which the ratio of the diameter to the wall thickness of the tube is $\geq 8:1$, more preferably $\geq 10:1$ and especially $\geq 12:1$.

The above-described embodiment is especially suited to the formation of tight bends of small radius in which the bend angle may be altered as desired by appropriate control of the angular movement of the roller 4 to conform the tube 1 around the former 3.

Figure 11:
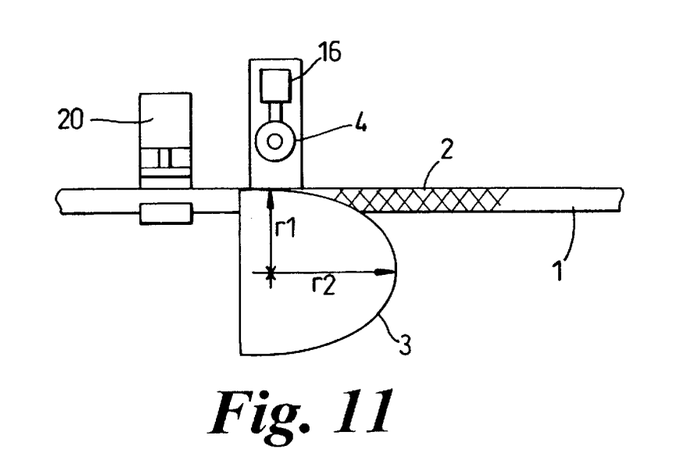
FIG. 11 is a side view similar to FIG. 7, of a modified forming unit for producing a bend of variable radius.

The bend is of constant fixed radius but this is not essential and FIG. 11 shows a modification in which the peripheral groove in the former 3 is of part elliptical shape for producing a bend of variable radius. In this embodiment, the change in radius as the roller 4 moves around the groove is compensated for by change in length of the piston/cylinder device 16 so that the roller 4 applies a constant force at the point where it co-operates with the fixed former 3.

In addition to tight bends, the invented method and apparatus are also suitable for the formation of sweeping bends of large radius. Thus, as shown in FIG. 12, the piston/cylinder device 16 traverses a slideway 24 to effect linear movement of the roller 4 and simultaneously changes in length to adjust the position of the roller 4 so that the roller 4 follows the groove in the fixed former 3 and applies a constant force at the point where it co-operates with the former 3.

Figure 12:
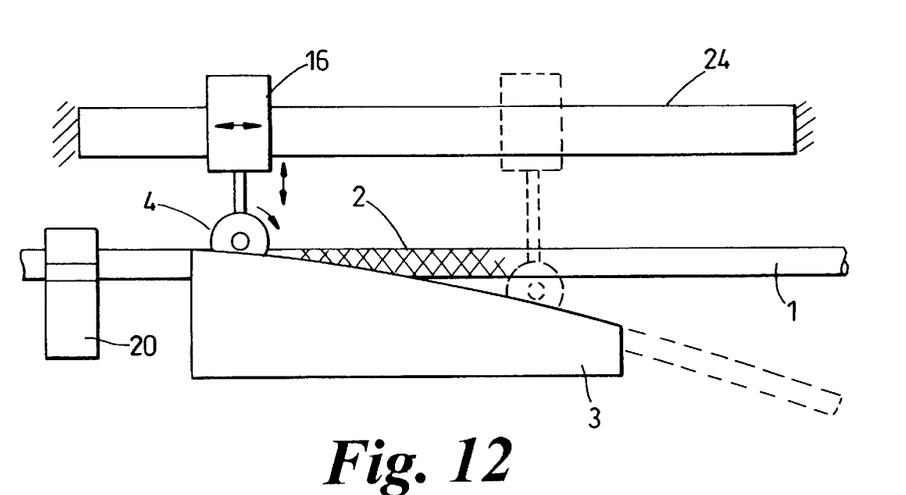
FIG. 12 is a side view of an alternative forming unit for producing a sweeping bend.
Figure 13:
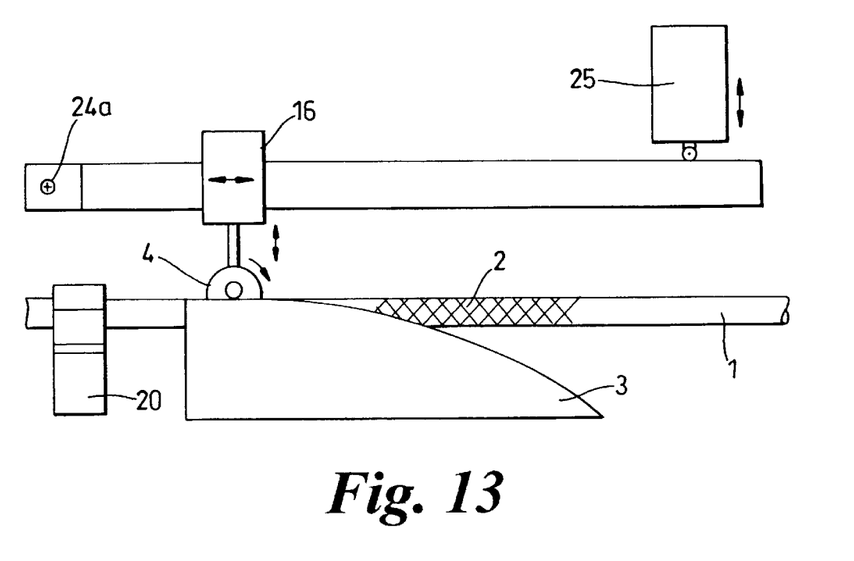
FIG. 13 is a side view, similar to FIG. 12, of a modified forming unit for producing a sweeping bend.
Figure 14:
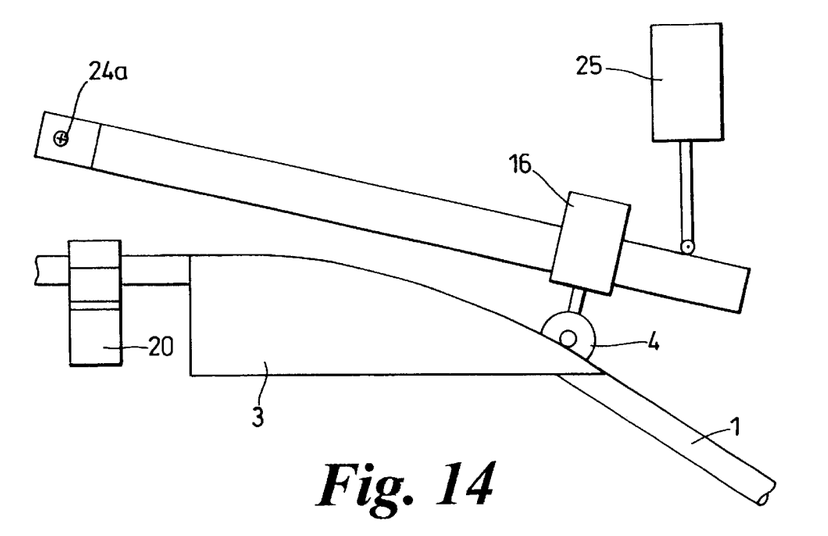
FIG. 14 is a side view of the forming unit shown in FIG. 13 showing the formation of the bend.

FIGS. 13 and 14 show a modification to FIG. 12 in which the slideway 24 is pivoted at one end 24a to adjust the position of the roller 4 as the piston/cylinder device 16 traverses the slideway so that the roller 4 follows the groove in the fixed former 3 and applies a constant force at the point where it co-operates with the former 3. Pivotal movement of the slideway is controlled by a pusher unit 25 so that the axis of the piston/cylinder device 16 is more normal to the face of the fixed former 3 than is the case with the arrangement shown in FIG. 12.

Figure 15:
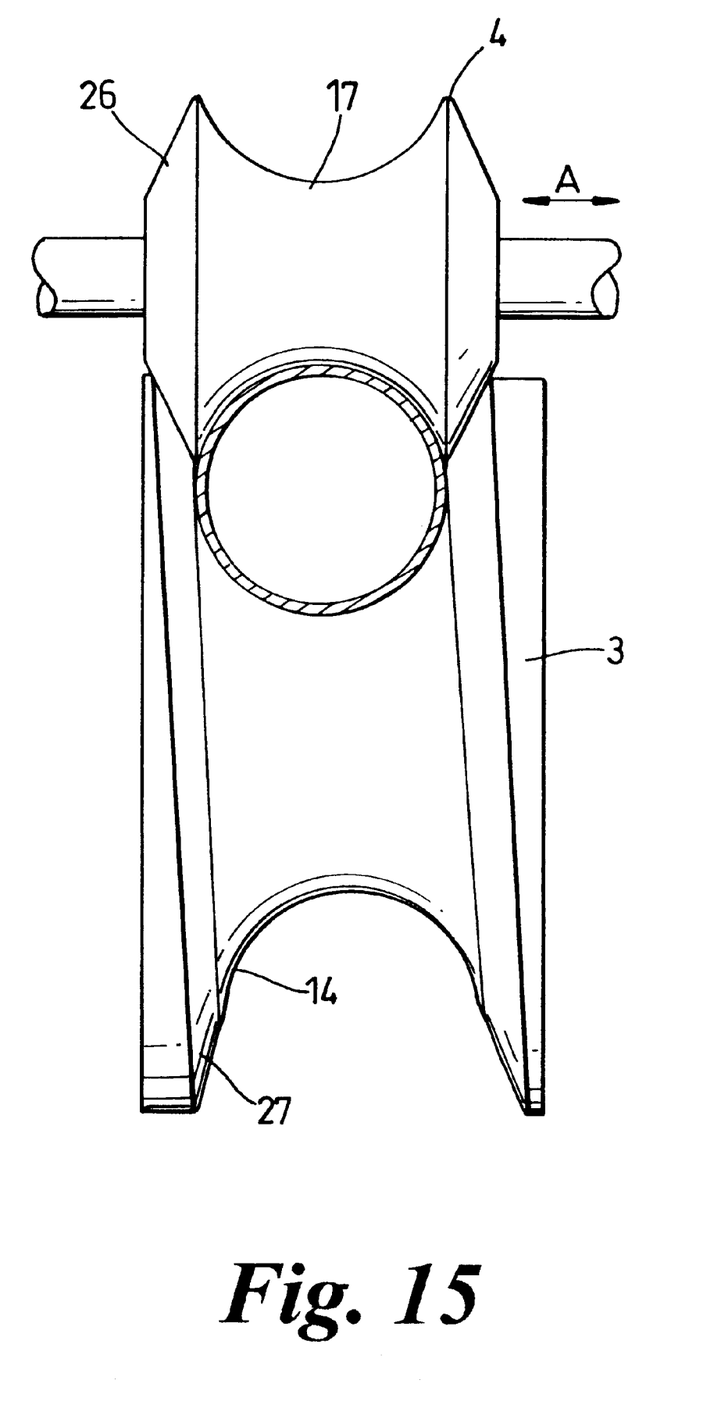
FIG. 15 is an end view, similar to FIG. 6, of a modified forming unit for producing a bend in two planes.

The forming units above-described produce single bends in one plane and FIG. 15 shows a modification for producing a single bend in two planes by arranging that the roller 4 can slide in the direction of arrow A parallel to its axis of rotation to follow a helical path provided by the groove 14 in the fixed former 3. As shown, the roller 4 and former 3 have angled flanks 26, 27 to prevent the roller 4 jamming in the groove 14. Alternatively, or in addition, the roller 4 may be spring loaded and/or angularly adjustable so as to follow the groove 14 and prevent jamming. The groove 14 in the former 3 may be helical or any other suitable shape.

Although the invention has been described thus far for the formation of a single bend, it will be understood that the invented method and apparatus may be adapted to produce multiple bends in the same or different planes allowing tubes of complex configuration to be produced for any desired use.

Figure 17:
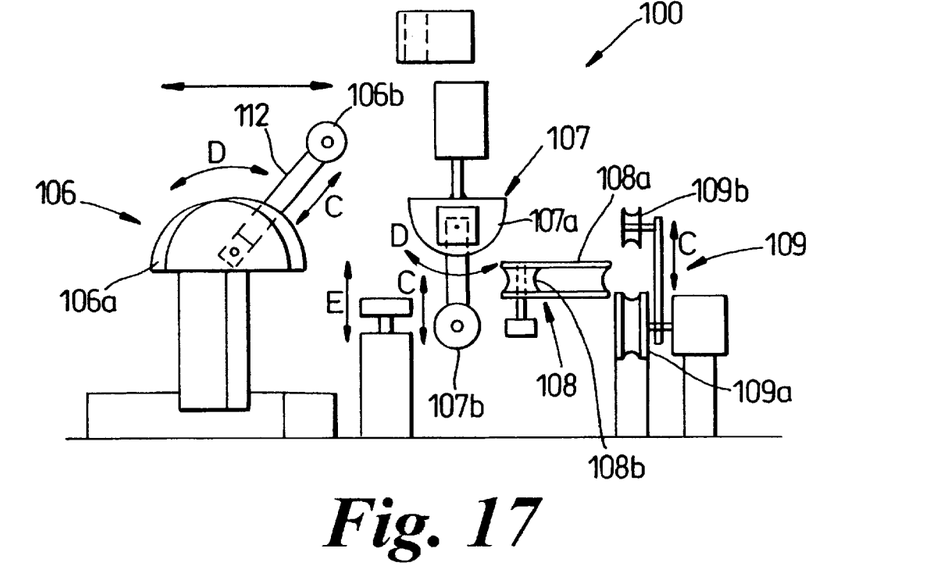
FIG. 17 is a schematic side view of apparatus for forming multiple bends.
Figure 18:
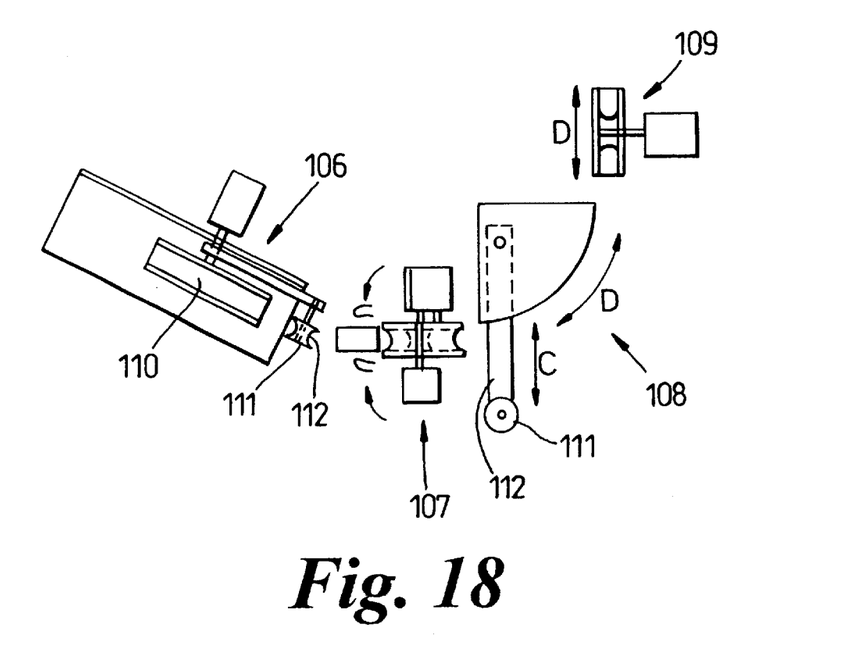
FIG. 18 is a schematic plan view of the apparatus shown in FIG. 17.
Figure 19:
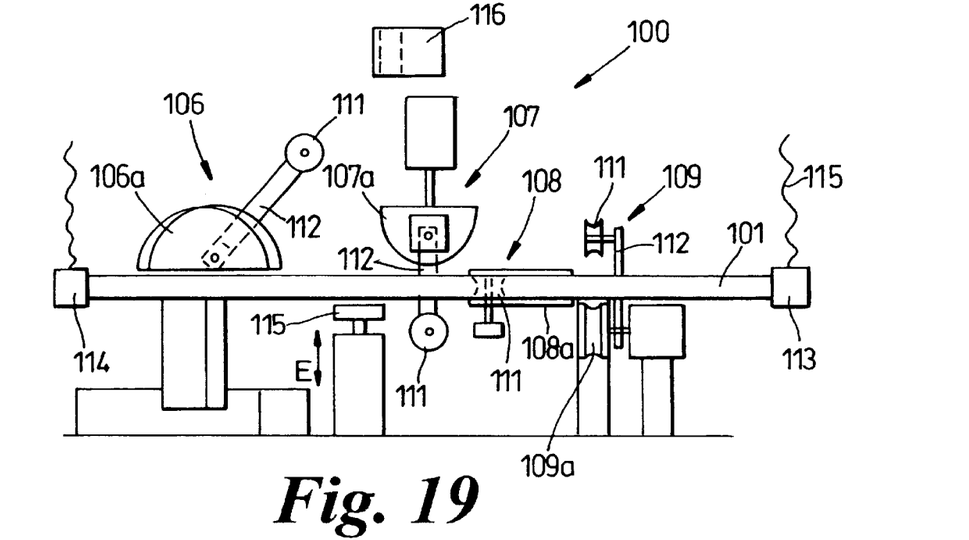
FIG. 19 is a schematic side view of the apparatus similar to FIG. 17 showing a length of tube located at the start of the bending operation.
Figure 20:
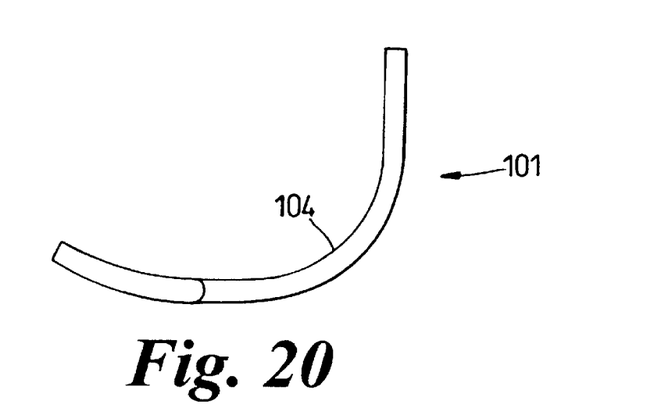
FIG. 20 is a plan view of a tube having multiple bends formed by the apparatus shown in FIGS. 17 to 19.
Figure 21:
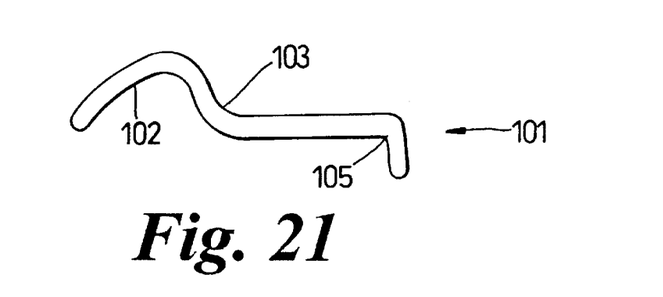
FIG. 21 is a side view of the tube shown in FIG. 20.

FIGS. 17 to 19 show schematically the forming station 100 of an apparatus for producing the tube 101 shown in FIGS. 20 and 21.

As shown, the tube 101 is of complex shape having four bends 102, 103, 104, 105 of different radius lying in different planes.

The forming station 100 comprises a separate former unit 106, 107, 108, 109 for each bend.

Each former unit comprises a former 106a, 107a, 108a, 109a which is fixed during the forming operation and a former 106b, 107b, 108b, 109b which is movable relative to the fixed former for conforming the tube 101 to the required bend configuration as described previously.

Each former unit 106, 107, 108, 109 may be movable independently or in combination with another former unit for adjusting the relative spatial arrangement of the former pairs. Such movement may be effected on initial set-up of the apparatus and/or between bending operations depending on the required configuration of the finished tube 101.

In this embodiment, each fixed former 106a, 107a, 108a, 109a has a peripheral groove 110 of constant radius and the associated movable former 106b, 107b, 108b, 109b comprises a roller 111 having a peripheral groove 112 for co-operating with the groove 110 as described previously, Each roller 111 is mounted for rotation at one end of an arm 112. The other end of the arm 112 is pivotally mounted at the centre of curvature of the groove 110 of the associated fixed former 106a, 107a, 108a, 109a.

Each arm 112 is length adjustable for moving the roller 111 in a radial direction towards and away from the associated fixed former 106a, 107a, 108a, 109a as shown by the arrows C between an open position for positioning the tube 101 between each pair before forming and removing the tube 101 after forming, and a closed position for the forming operation.

Each arm 112 is also pivoted for moving the roller 111 around the fixed former 106a, 107a, 103a, 109a as shown by the arrows D for conforming the tube 101 to the required bend configuration during the forming operation.

The grooves 110, 112 of each former pair 106, 107, 108, 109 are co-operable to enclose a section of the tube 101 therebetween in the closed position as described previously. In this way, as the roller 111 moves around the fixed former 106a, 107a, 108a, 109a, the tube 101 is totally enclosed at the point where pressure is applied to conform the tube 101 to the required bend configuration as described previously.

Operation of the apparatus to form the tube 101 shown in FIGS. 20 and 21 will now be described.

Firstly, an appropriate length of the tube 101 of suitable thermoplastic material is heated to soften the thermoplastic material sufficiently for conforming to the required bend configuration. This heating is effected with the tube 101 in a straight condition by a heating unit (not shown) similar to that described previously for heating either discrete sections of the tube 101 where each bend is to be formed or the section containing all the bends leaving each end of the tube 101 unheated.

A heating station (not shown) may be provided comprising a plurality of heating units arranged to heat the tubes 101 to the required condition and deliver the heated tubes 101 in sequence to a loading station (not shown) according to a predetermined cycle for transfer to the forming station 100.

At the loading station, a pair of seal units 113, 114 are attached to opposite ends of the tube 101 and compressed air admitted through a supply line 115 connected to one of the seal units to provide a pressure inside the tube 101 which is higher than atmospheric pressure outside the tube 101 for supporting the tube 101 internally during the bending operation.

The tube 101 with the seal units 113, 114 attached is transferred to the forming station 100 where it is positioned between the fixed formers 107a, 108a and the associated rollers 111 of the inner pair of former units 107, 108 as shown in FIG. 19.

The rollers 111 are then moved from the open position to the closed position locating the tube 101 at two spaced apart positions. The seal units 113, 114 are then released from the transfer device (not shown) so that both ends of the tube 101 are free for the subsequent bending operation. During this operation, the tube 101 may also be supported on the underside by a platform 115 which can be raised and lowered in the direction of arrow E to assist alignment of the tube 101 with the former units 107, 108.

With the tube 101 held by the inner pair of former units 107, 108, the rollers 111 are moved relative to the associated fixed formers 107a, 108a to form the bends 103, 104 simultaneously.

One end of the tube 101 extends vertically and is held temporarily by a clamp 116 while the former unit 106 is moved to the required position for forming the bend 102. The other end of the tube 101 extends horizontally and is positioned relative to the former unit 109 for forming the bend 105.

The rollers 111 of each former unit 106, 109 are then moved towards the associated fixed former 106a, 109a so that the tube 101 is held between the outer pair of former units 106, 109.

The rollers 111 are then moved relative to the associated fixed formers 106a, 109a to form the bends 102, 105 simultaneously.

With the tube 101 held in the required configuration, it is cooled by blowing compressed air over the outside and/or by passing compressed air through the inside. For this the seal unit at the other end remote from the supply of compressed air may be opened to allow the compressed air to escape while maintaining sufficient internal pressure to prevent the tube 101 collapsing. External cooling may be effected when all the bends have been formed or when each bend is formed by providing a source of compressed air adjacent each bend region.

Once the tube 101 is cooled sufficiently to set the thermoplastic material to retain the desired shape, the tube 101 is removed from the forming station 100 and seal units 113, 114 detached. The former units 106, 107, 108, 109 are returned to the original position to receive tube next tube 101 from the loading station via the transfer device.

As will be appreciated the apparatus above-described enables complex shapes with multiple bends to be produced while the cross-section of the tube 101 is maintained by the pressure differential created by the compressed air admitted to the tube 101 to internally pressurise the tube 101 prior to forming the bends 102, 103, 104, 105. By forming the bends simultaneously and sequentially in pairs, the tube is held in a required position without additional clamping. It will be understood that each bend could be formed in sequence although forming pairs of bends simultaneously reduces cycle times and handling.

It will also be understood that the invented method and apparatus has application to a wide range of thermoplastics materials including polyamide, polyurethane, polyethylene, polypropylene, polyvinylchloride, polyacetal, polybutyleneterephalate and other elastomers and copolymers of these thermoplastics.

It will be further understood that the invented method and apparatus may be used to shape both mono-layer and multi-layer tubes. Multi-layer tubes may comprise a single thermoplastics material or combinations of two or more different thermoplastics materials. For example, a tube wall comprising layers of different thermoplastics material may be obtained by co-extrusion of the thermoplastics material.

It will also be understood that the invented method and apparatus may have application to tubes with or without any reinforcement. For example, a reinforcement layer such as a metallic or non-metallic sleeve may be incorporated in the tube wall during manufacture. Alternatively, reinforcement material, such as glass or carbon fibre may be incorporated into the thermoplastics material forming the tube wall.

Finally, it will be understood that tubes may be formed by the invented method and apparatus for a wide range of diverse applications which may require specific grades of thermoplastics Materials to be used with or without reinforcement as mentioned above and/or end fittings at one or both ends to connect the tube for its intended use. For example, fuel filler pipes fuel vapour pipes, ventilation pipes, drain pipes and coolant pipes may be formed by the invented method and apparatus.

What is claimed is:

1. A method of forming a bend having a required configuration in a tube of thermoplastic material comprising heating a region of a tube in which a bend is to be formed while maintaining the pressure inside and outside of the tube at substantially atmospheric pressure, until said thermoplastic material becomes sufficiently plastic for subsequent shaping to a required bend configuration, positioning said tube between relatively movable formers providing external support around a section of said heated region of said tube, relatively moving said formers to form progressively said required bend configuration while simultaneously providing internal support for said tube by a pressure differential between the inside and outside of said tube, and cooling said tube to set said thermoplastic material and retain said required bend configuration.

2. A method according to claim 1 wherein said pressure differential is created by the provision of a fluid medium within said tube during said forming operation.

3. A method according to claim 2 wherein said fluid medium is confined within said tube by sealing means at each end of said tube.

4. A method according to claim 1 wherein cooling is effected by a fluid medium caused to flow over the exterior and/or through the interior of said tube.

5. A method according to claim 1 wherein said pressure differential is maintained during said cooling stage.

6. A method according to claim 1 wherein external support on the inside of said bend is maintained as the bend is developed.

7. A method according to claim 1 wherein external support on the outside of said bend is provided locally at the point where bending forces are applied and moves along said tube as said bend is developed.

8. A method according to claim 1 wherein said tube is totally enclosed between said formers at the point where bending forces are applied.

9. A method according to claim 1 wherein a plurality of bends are formed at spaced apart positions along the length of said tube.

10. A method according to claim 9 wherein multiple bends are formed in the same or different planes.

11. A method according to claim 9 wherein multiple bends are formed simultaneously.

12. A method according to claim 9 wherein multiple ends are formed sequentially.

13. Apparatus for forming a bend in a tube of thermoplastic material comprising means for heating a predetermined region of a tube while maintaining the pressure inside and outside of the tube at substantially atmospheric pressure to soften said thermoplastic material for subsequent shaping, means for shaping said heated region of said tube to form a bend having a required configuration, and means for cooling said tube to set said thermoplastic material and retain the required bend configuration, said shaping means including relatively movable former means for externally supporting a section of said heated region of said tube at the point of bending and means for internally supporting said tube during said bending operation by a pressure differential between the inside and outside of said tube.

14. Apparatus according to claim 13 wherein said former means provide localised external support around said tube as said bend is formed.

15. Apparatus according to claim 13 wherein said former means comprises a fixed former having a profile corresponding to the inside of said bend and a former movable around said fixed former to conform said tube to said profile of said fixed former and provide support for the outside of said bend at the point of bending.

16. Apparatus according to claim 15 wherein said fixed former has a peripheral groove corresponding to the radius of said required bend around which said tube is formed and said movable former has a peripheral groove co-operable with said groove in said fixed former to provide external support around the section of said tube therebetween.

17. Apparatus according to claim 16 wherein said groove in said fixed former is of U-shape in radial cross-section and is a depth sufficient to receive said tube and the marginal edge of said movable former.

18. Apparatus according to claim 15 wherein said former means comprises a plurality of former units each comprising a fixed former and a movable former arranged at a forming station for producing a plurality of bends.

19. Apparatus according to claim 13 wherein said means for internally supporting said tube comprises a source of fluid connectable to the interior of said tube.

20. Apparatus according to claim 13 wherein said means for cooling said tube is arranged to cool the interior and/or exterior of said tube.

21. The method according to claim 1 further comprising ceasing heating of said tube prior to positioning of said tube.

22. The method according to claim 1 further comprising:

enclosing a section of said heated region of said tube between relatively movable formers providing external support around said enclosed section of said heated region of said tube, relatively moving said formers to enclose discrete sections of said heated region of said tube in turn and apply a bending force to each said enclosed section to form progressively said required bend configuration while simultaneously providing internal support for said tube by a pressure differential between the inside and outside of said tube.

23. The apparatus according to claim 13 further comprising means for ceasing heating of said tube prior to shaping of said tube.

24. The apparatus according to claim 13 wherein said shaping means further comprises relatively movable former means for enclosing and externally supporting discrete sections of said heated region of said tube in turn and apply a bending force to each enclosed section to form progressively said bend.

25. A method of forming a bend having a required configuration in a tube of thermoplastic material comprising:

heating a region of a tube in which a bend is to be formed until said thermoplastic material becomes sufficiently plastic for subsequent shaping to a required bend configuration;

enclosing a section of said heated region of said tube between relatively movable formers providing external support around said enclosed section of said heated region of said tube;

relatively moving said formers to enclose discrete sections of said heated region of said tube in turn and apply a bending force to each said enclosed section to form progressively said required bend configuration while simultaneously providing internal support for said tube by a pressure differential between the inside and outside of said tube; and cooling said tube to set said thermoplastic material and retain said required bend configuration.

26. Apparatus for forming a bend in a tube of thermoplastic material comprising:

means for heating a pre-determined region of a tube to soften said thermoplastic material for subsequent shaping;

means for shaping said heated region of said tube to form a bend having a required configuration, said shaping means including relatively movable former means for enclosing and externally supporting discrete sections of said heated region of said tube in turn and apply a bending force to each enclosed section to form progressively the bend;

means for cooling said tube to set said thermoplastic material and retain the required bend configuration; and means for internally supporting said tube during said bending operation by a pressure differential between the inside and outside of said tube.

* * * * *